April 23, 1963  H. F. LUKAS, JR  3,086,718
METHOD AND APPARATUS FOR SEPARATING METALLIC PARTICLES
Filed April 6, 1959  6 Sheets-Sheet 1

INVENTOR.
HENRY F. LUKAS, JR.
BY
Teare, Kramer, Sturges, Fetzer
ATTORNEYS

April 23, 1963 H. F. LUKAS, JR 3,086,718
METHOD AND APPARATUS FOR SEPARATING METALLIC PARTICLES
Filed April 6, 1959 6 Sheets-Sheet 4

INVENTOR.
HENRY F. LUKAS, JR.
BY
Teare, Kramer, Sturges & Fetzer
ATTORNEYS

INVENTOR.
HENRY F. LUKAS, JR.

April 23, 1963 H. F. LUKAS, JR 3,086,718
METHOD AND APPARATUS FOR SEPARATING METALLIC PARTICLES
Filed April 6, 1959 6 Sheets-Sheet 6
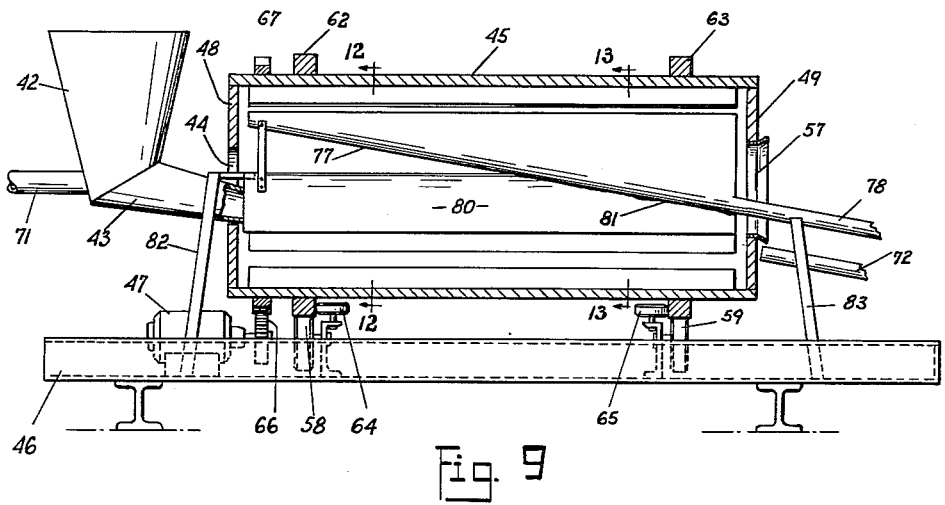
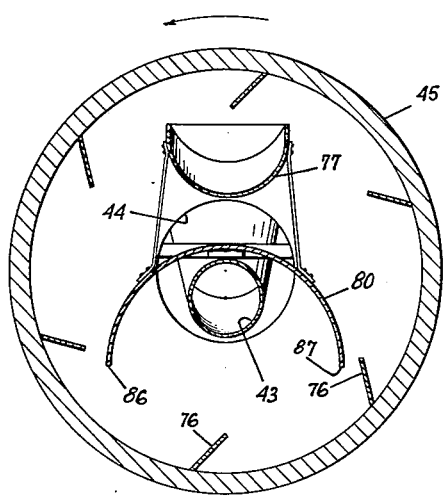
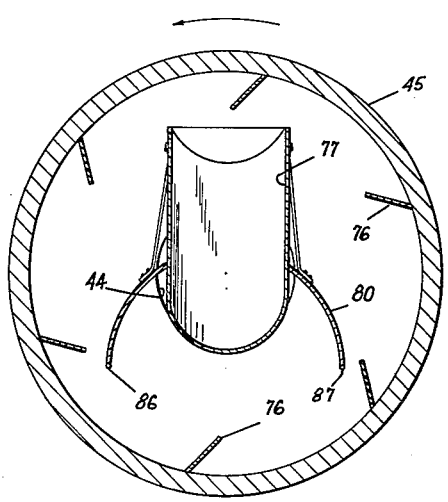
INVENTOR.
HENRY F. LUKAS, JR.
BY
Teare, Kramer, Sturges & Felzer
ATTORNEYS

United States Patent Office 3,086,718
Patented Apr. 23, 1963

3,086,718
METHOD AND APPARATUS FOR SEPARATING METALLIC PARTICLES
Henry F. Lukas, Jr., Brecksville, Ohio, assignor, by direct and mesne assignments, of three-fourths to W. E. Plechaty Co., Cleveland, Ohio, a corporation of Ohio
Filed Apr. 6, 1959, Ser. No. 804,232
6 Claims. (Cl. 241—24)

This invention relates to a method and apparatus for reclaiming metal from open hearth and blast furnace slag, as well as from flue dust, fines, mill refuse, gas washer and open hearth checker dust.

Heretofore, an effort has been made to reclaim particles of metal by mechanical separation, wherein the slag was crushed and then passed over a magnetic drum. Such method, however, has been inefficient in that the refuse has contained a large percentage of metallic particles which would not contact the surface of the magnetic drum. This is partially due to the fact that the material must be passed over the drum at a rapid rate to assure economy of operation and to the fact that some of the particles are entrapped within the slag and thus are prevented from moving sufficiently close to the surface of the drum to be attracted and held thereby.

Another source of refuse is that which is known in the trade as river scale. It comprises mainly the scale which is removed from the steel by the pickling process in preparation of the metal for working in the mill. The practice in most mills has been to discharge the scale into a nearby river, and as a result, it is mixed with mud and other river bottom ingredients and has, therefore, been regarded as entirely useless although concededly, it is relatively high in iron content. It has not been regarded as practical to treat the river scale by the mechanical separator, because of the adherence of the foreign material to the scale.

Flue dust is relatively high in iron content, but due to the size of the particles, it has been in the class of fines and, hence, has been transferred to the sintering plant and processed before it could be used in the furnace. The sintering, however, is an expensive and time-consuming process. Flue dust has contained foreign ingredients—using the term "foreign" as meaning elements other than iron—and the treatment accorded to it at the sintering plant has been directed toward the removal of such elements, but again this has been an expensive and time-consuming undertaking.

Material, such as has been collected from the gas washer, contains a thickener which is a gummy substance but, inasmuch as the material has been of about 35% iron, it has been spread upon the ore pile and then introduced with the ore into the furnace through the skip car. Due to the nature of the gummy material in the gas washer refuse, however, difficulties have been experienced by sticking of the materials to the skip car, and to walls of the hopper and bells at the top of the furnace, where it is difficult to clean the metal and where the presence of any adhering material at the joint between the bell and the hopper would prevent proper closing of the bell. As a result, the difficulties encountered outweigh the economic value of the iron recovery.

An object of the present invention, therefore, is to provide a method and apparatus by means of which the material which heretofore has been regarded as refuse and unsuitable for economic separation by the mechanical magnetic separation process, may now be recovered on an economical basis. The invention thus makes available products which have previously been regarded as waste material and additionally results in a product of exceptionally high iron content.

A further object of the present invention is to provide a system by means of which the particles of metal to be recovered may be obtained as a finished product of different selective size regardless of whether the metal initially is associated with slag or other non-metallic particles, and regardless of whether the mixture exists in a fine state or relatively coarse state.

The foregoing objects are accomplished by crushing the material containing the metallic particles and screening it to a maximum size. That, for example, which will not pass through a screen having ½" mesh openings is returned to the crusher, whereas that which passes through the screen, but which will not pass through a finer screen, such as 20 mesh screen, is conveyed to a magnetic separator which operates on the principle of agitation and selective lifting. The metallic particles so removed are satisfactory for immediate use in a furnace, whereas the particles which are not picked up by the magnet are returned to the crusher for further treatment.

The material which passes through the 20 mesh screen is separated by a finer screen, such as an 80 mesh screen, whereupon the particles which pass therethrough are subjected to a wet magnet process for removal of the metallic particles. The material which will not pass through the 80 mesh screen is then subjected to a sink and float process, wherein the sink material is treated in progressive stages so as to recover the media, whereas the material which floats is subjected to an independent progressive treatment to recover the media which may adhere thereto. This system will function to provide a continuous process for the recovery of metallic particles which will pass through an 80 mesh screen up to a size which will just pass through a screen having one-half inch mesh opening. This range is adequate for all refuse material incident to the operation of open hearth and blast furnaces.

Referring to the drawings, FIG. 1 is a flow chart showing the progressive steps in the operation of a system embodying the present invention;

FIG. 6 is an elevational view of a representative feeding device which may be used in connection with the apparatus shown in FIG. 3;

FIG. 7 is an elevational view of another form of apparatus used in another stage of the system;

FIG. 9 is a vertical section taken longitudinally through the apparatus of FIG. 8;

Figure 8:
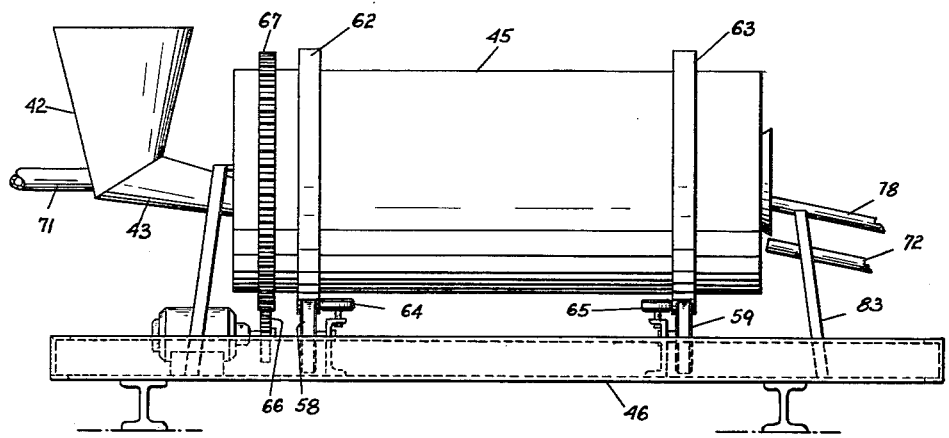
FIG. 8 is an elevation showing a portion of the apparatus of FIG. 7 but on a scale larger than that of FIG. 7.
Figure 10:
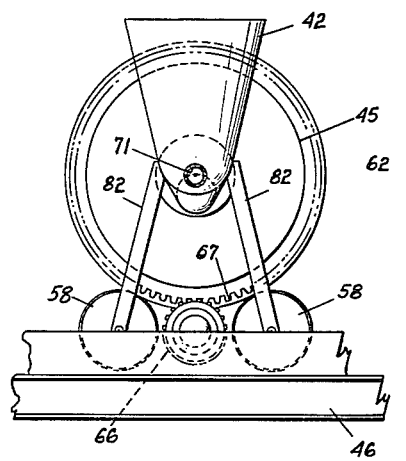
FIG. 10 is an end elevation of the apparatus of FIG. 8 as viewed toward the inlet end thereof.
Figure 11:
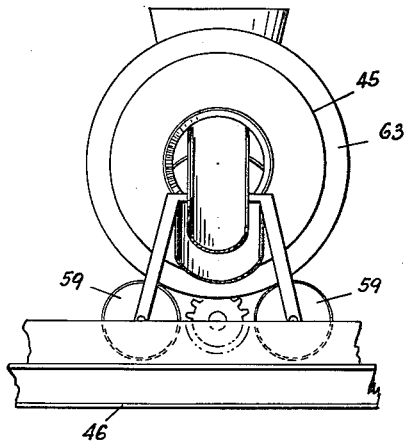

FIG. 11 is an end elevation of the apparatus of FIG. 8, as viewed toward the discharge end thereof; and FIGS. 12 and 13 are vertical sections taken on planes indicated by the lines 12—12 and 13—13 respectively in FIG. 9.

Figure 1:
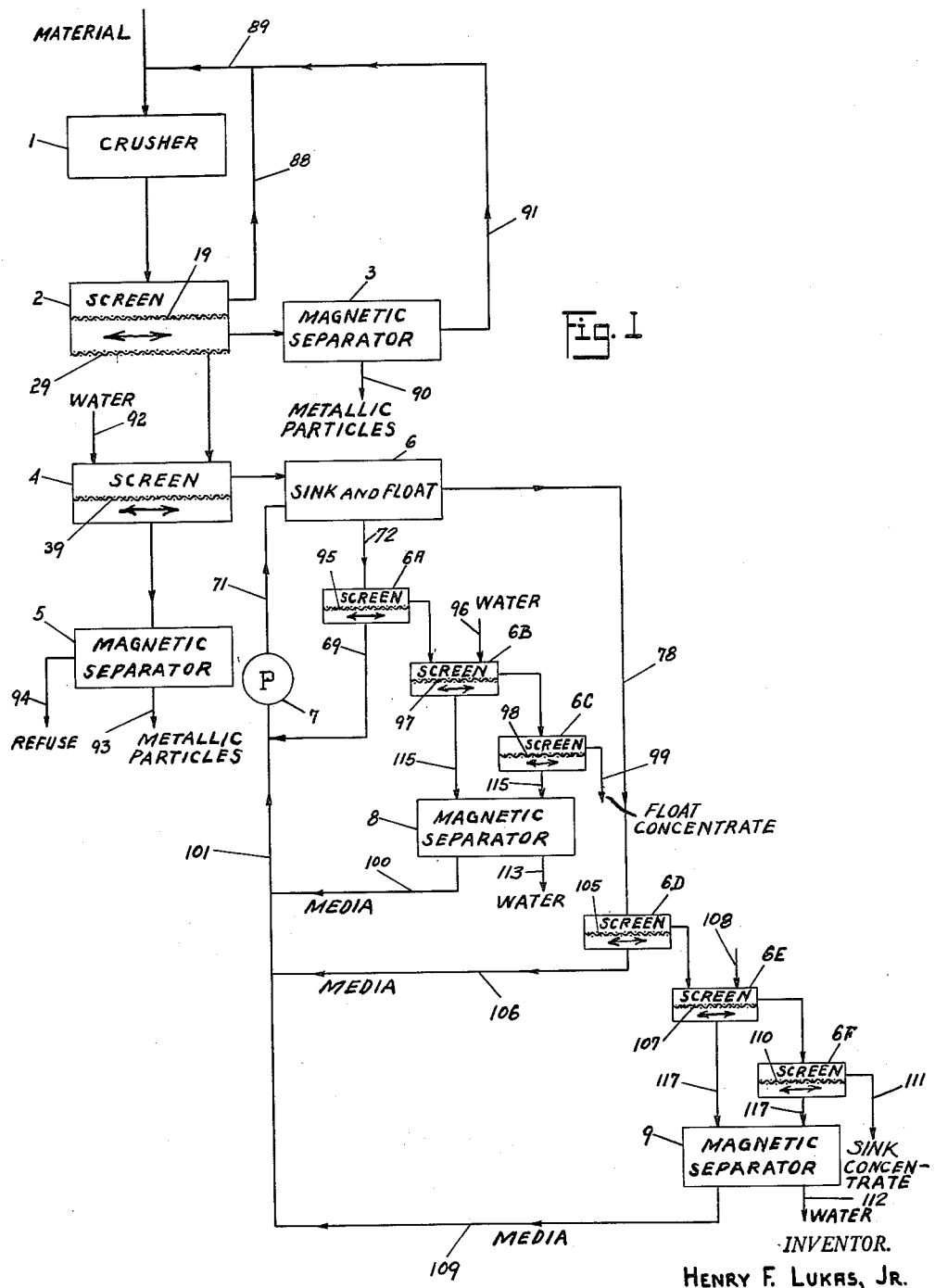

Referring to FIG. 1, the material to be recovered is fed to a mechanical crusher 1, and is then transmitted to a mechanically agitated screen 2 which is shown as a double deck screen indicated at 19 and 29 respectively. Preferably, the screen 19 has ½" mesh openings, whereas the screen 29 has 20 mesh openings The material which will not pass through the screen 19 is returned to the crusher as indicated by the arrows on the lines 88 and 89 for further crushing treatment, whereas the material which passes through the screen 19, but which is retained by the screen 29, is subjected to a mechanically actuated magnetic separator which operates to lift the metallic particles from the mixture. The metallic particles are discharged at 90 as finished material of a size which ranges between plus 20 mesh and minus ½″. The rejected material is returned to the crusher as indicated by the arrows on the lines 91 and 89 for further crushing.

The material which passes through the screen 29 of the separator 2 is fed to a mechanically vibrated screen 4 which has a screen 39, preferably of 80 mesh material. At the separator 4, water is introduced, as indicated at 92, and the material which passes through the screen is fed to a magnetic separator 5, from which the metallic particles are discharged at 93. Such finished product has a size which ranges up to 80 mesh. The refuse or slag from the separator 5 is discharged at 94.

The material which is retained by the screen 39 in the separator 4 is subjected to a sink and float process embodying apparatus indicated in general at 6, in which a heavy media is used in a continuously circulating system. The media employed is an aqueous slurry of material which has a specific gravity between that of the metallic particles to be recovered, and that of the slag or non-metallic particles. One form of media suitable for such purpose is ferrosilicon having a size such as will pass readily through a 100 mesh screen and comprising approximately 15% by weight of silica, and 85% by weight iron. This is known in the trade as a 15% ferrosilicon powder. The slurry is maintained in a concentration of ferrosilicon of 50% to 85% by weight, with the balance being water, and the media is recovered for reuse.

The material which sinks in the separator 6 is heavier than the ferrosilicon and comprises the metallic particles to be recovered. Such material is fed to a mechanically agitated screen 6D which has an 80 mesh screen indicated at 105. The slurry of media is fed through conduits 106 and 101 to a pump 7 for recirculation in the system.

The material which is retained by the screen 105 is fed to another mechanically agitated screen indicated at 6E, at which point water is added, as indicated at 108. The screen indicated at 107 in 6E is also an 80 mesh screen whereby additional media is recovered, and is fed to a magnetic separator 9 through conduit 117. The material which is retained by the screen 107 is fed to another vibratory separator 6F which is also provided with an 80 mesh screen 110, where the slurry is further recovered and is fed to the separator 9 whereas the particles which are retained by the screen 110 are discharged at 111. Such particles are the sink concentrate and comprise the relatively heavy metallic particles.

The magnetic separator 9 withdraws the ferrosilicon from the diluted slurry, and returns it through the conduit 109 and 101 to the pump 7, whereas the water is discharged at 112.

The float material which is discharged from the separator 6 is fed through a conduit 72 to a vibratory screen indicated at 6A which is provided with a screen 95 preferably of 80 mesh. The slurry which passes through the screen is conducted by conduits 69 and 101 to the pump 7. The material which is retained by the screen 95 is fed to a vibratory screen 6B, which has a screen 97 of 80 mesh and onto which water is fed, as indicated at 96. This separator operates to wash the material and to remove the slurry therefrom. The slurry which passes through the screen is fed to a magnetic separator 8, which operates to remove the ferrosilicon from the diluted slurry, whereupon it is returned through conduits 100 and 101 to the pump 7. The material which is retained by the screen 97 is fed to a vibratory separator 6C, which has a screen 98, preferably of 80 mesh, which operates to separate the media from the non-metallic particles as much as possible. The material which passes through the screen is fed to the magnetic separator 8 which recovers the ferrosilicon and delivers it through the conduits 100 and 101 to the pump, whereas the water is discharged at 113. The material which is retained by the screen 98 is discharged at 99. Such material is the float concentrate and comprises relatively light non-metallic particles.

The foregoing system operates as a continuous process to recover metallic particles of such size as are readily usable in blast furnace and steel furnace operations. It functions to solve a problem of recovering material which heretofore has been regarded as incapable of recovery economically by known methods of separation.

The crusher 1 may be a mechanical crusher of any suitable structure available on the market as, for example, one which is manufactured in the trade by Williams Crusher Company.

The vibratory separator 2 may be purchased on the market and identified, for example, as Ty-Rock, F-600, manufactured by W. S. Tyler Company. The vibratory separator 4 is known in the trade as a single deck screen such, for example, as identified by Ty-Rock, F-600 manufactured by W. S. Tyler Company.

The vibratory screen separators indicated at 6A, 6B and 6C, may be incorporated as a unitary structure and purchased as a unit in the open market as Ty-Rock, F-600 and manufactured by the W. S. Tyler Company. Similarly, the separators indicated at 6D, 6E and 6F may comprise a unitary structure of the type represented by 6A, 6B and 6C.

Figure 2:
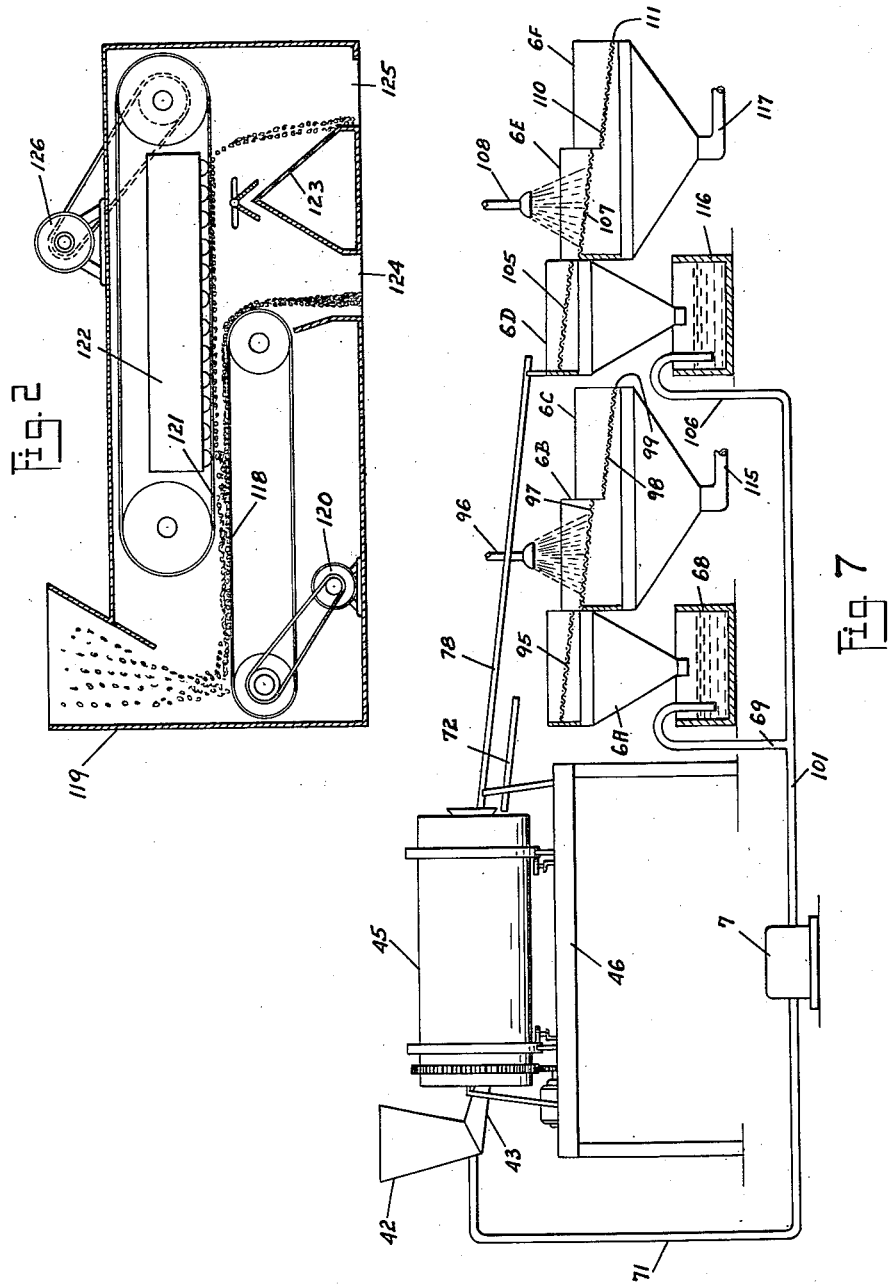
FIG. 2 is a vertical section taken through a typical pick-up magnet apparatus used in one stage of the system.

The magnetic separator, indicated at 3 is shown in general in cross-sectional view in FIG. 2, whereas the magnetic separators indicated at 5, 8 and 9 are shown in greater detail in FIGS. 3 to 6 inclusive. The apparatus of FIG. 7 is shown in greater detail in FIGS. 8 to 13 inclusive.

Figure 3:
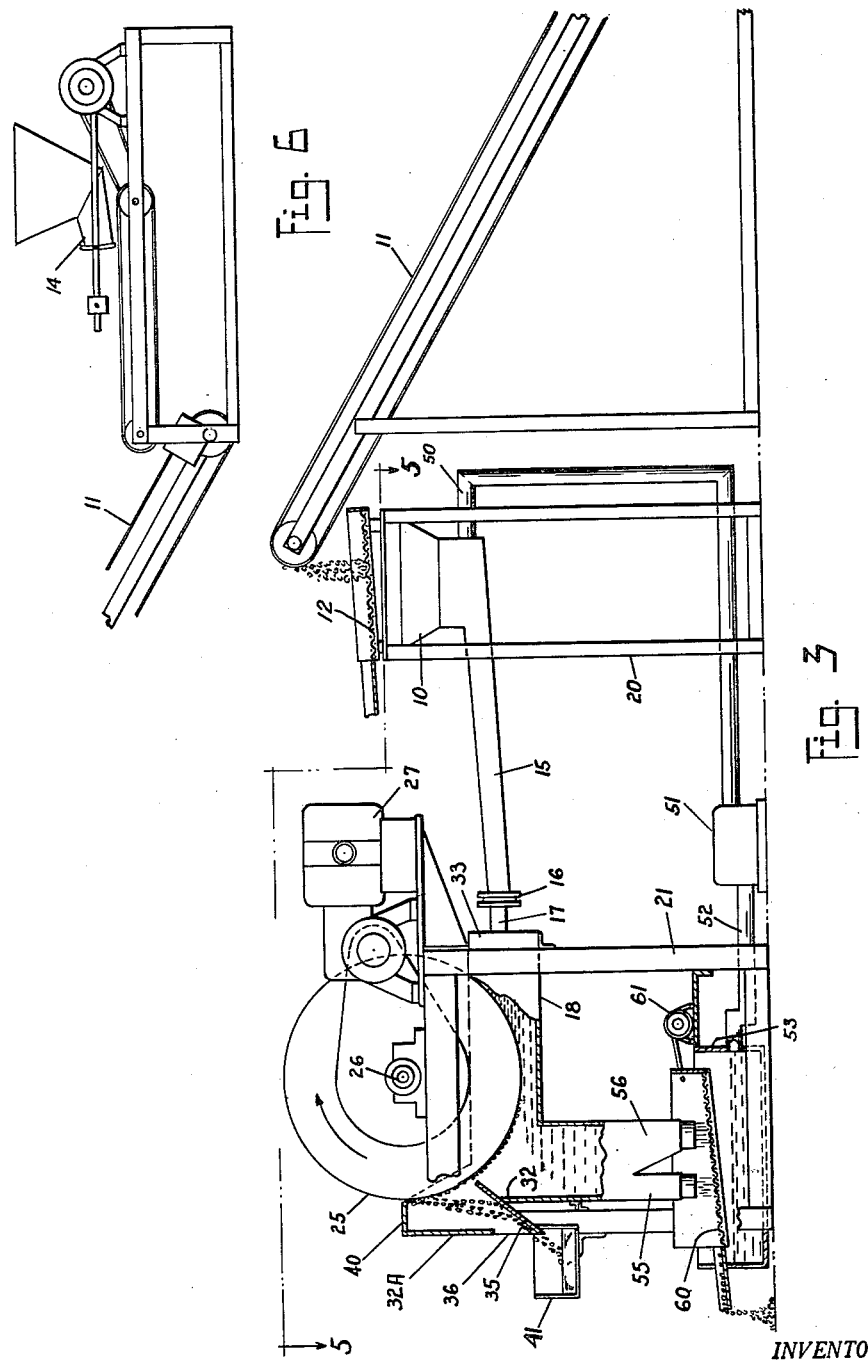
FIG. 3 is an elevational view of an apparatus for carrying out another stage of the system.
Figure 4:
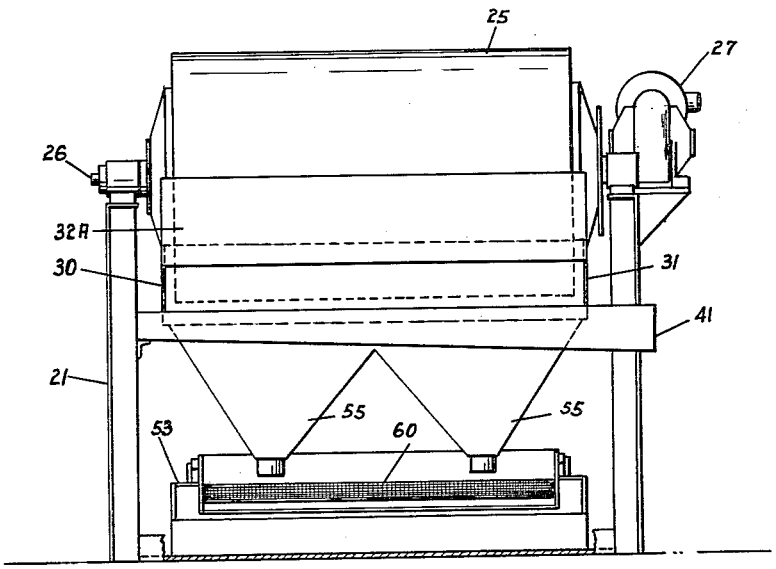
FIG. 4 is an end elevation, partly in section, of the apparatus shown in FIG. 3.
Figure 5:
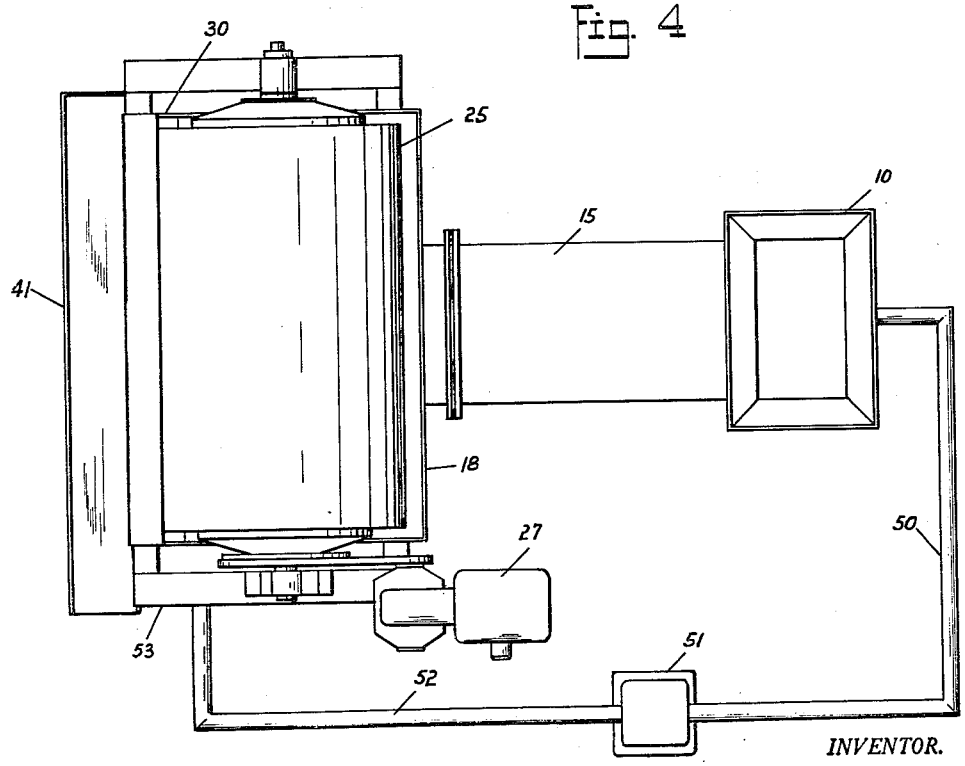
FIG. 5 is a plan view taken on a plane indicated by the lines 5—5 in FIG. 3.

The apparatus indicated at 5 is illustrated in FIG. 3 wherein the material to be separated may be conveyed from the separator 4 to a hopper 10 upon an endless conveyor 11, onto which it may be fed uniformly by a suitable feeding device indicated in general at 14 in FIG. 6.

The hopper 10 forms the inlet to a closed conduit 15 which is connected at 16 to an inlet conduit 17 in a casing 18. The hopper 10 and conduits 15 are supported upon a frame 20, while the casing 18 is supported upon a frame 21. The latter frame also supports a magnetic drum 25 which is mounted for rotation on a shaft 26, and is adapted to be rotated by a motor indicated in general at 27. The shaft is journaled on the frame 21 and the motor is likewise shown as being supported on the frame 21.

The casing 18 extends across the face of the drum and above the bottom thereof. The end walls 30 and 31 of the casing extend above the bottom of the drum and cooperate with the side walls 32 and 33 to form a conduit which is in communication with the conduit 15. A plate 35 extends lengthwise of the casing and is supported in an inclined position extending downwardly from the top of the wall 32 and provides a chute for discharging recoverable metallic particles through an opening 36 in an offset extension 32A of the wall 32. The top wall 40 extends from the wall 32A into close proximity with the surface of the drum and operates to scrape magnetic particles therefrom and drop them onto the plate or chute 35 from whence they are received in a chute 41 and conveyed from the apparatus.

To convey the material from the hopper 10 into the casing 18, I have shown a pipe 50 which is connected to the conduit 15 near the inlet end thereof, and which forms part of a system through which a liquid, such as water, is circulated. Such system includes a pump 51 which is connected to the conduit 50 and to a conduit 52, the latter of which is connected to a reservoir 53. The liquid flowing through conduit 50 into the conduit 15 mixes with the material which passes through the screen 12 and forms with the liquid a slurry which flows through the conduits 15 and 17 into the casing 18, where it is constricted adjacent the lowermost region of the drum 25. The drum operates to draw the metallic particles out of the slurry, and to carry them around to a point where they can be discharged through a conduit independently of the slurry. The slurry of liquid and non-magnetic particles is then conveyed from the casing 18 onto a mechanical separator, such as a vibrating screen, which operates to remove the non-magnetic particles from the liquid and to allow the liquid to flow into the reservoir 53. The reservoir acts as a settling basin to collect sediment which may be carried through the screen. Provision for removal of the sediment, either continuously or intermittently, as desired, may be provided. One such method would include the use of a screw conveyor positioned at the bottom of the reservoir, but not shown.

In FIG. 3, the slurry which includes the liquid and non-magnetic particles is discharged through conduits 55 and 56 onto the screen which is indicated at 60. This is preferably a vibratory screen which may be operated by means of a motor indicated in general at 61. Where the liquid is recirculated, it may be withdrawn from the reservoir through conduit 52 by the pump 51.

I have found that an aqueous slurry for use in the system of FIG. 3 operates satisfactorily if the mixture is used in the proportion of ten to fifty percent by weight with the balance being water, but that best results are obtained if the mixture is 25% by weight.

The separator 6 is shown in FIG. 7, wherein the material to be separated may be fed into a hopper 42, the lower end of which is in communication with a conduit 43. The inner end of the conduit extends into an opening 44 in a drum 45. The drum is supported for rotation upon a frame 46 which also may support a motor 47 for rotating the drum.

The drum is cylindrical in shape, the ends of which are closed as by plates 48 and 49. The plate 48 has a centrally located inlet opening 44 therein, while the plate 49 has a centrally located discharge opening 57 therein. Preferably, the drum is supported with its axis in substantially horizontal position upon two sets of rollers, indicated at 58 and 59 respectively, each of which is journaled for rotation on the frame. The sets of rollers engage annular bands or tracks 62 and 63 respectively on the outer surface of the drum. The drum may be held against axial shifting by means of guide rollers 64 and 65, which are journaled on the frame for rotation upon vertical axes, and which are adapted to engage the side walls of the bands 62 and 63 respectively.

To rotate the drum, I have shown a pinion 66 which is adapted to be rotated by the motor 47 and to mesh with a gear 67 which is annular in shape and is secured to the outer surface of the drum.

The drum is utilized for receiving a slurry of water and a powdered material which has a specific gravity between that of the metallic particles to be separated, and that of the slag or non-metallic particles. One form of material suitable for such purpose is ferrosilicon having a size as will pass readily through a 100 mesh screen, and comprising approximately 15% by weight silica and 85% by weight iron. This is known in the trade as 15% ferrosilicon.

The slurry is maintained in a concentration of ferrosilicon of 50% to 85% by weight, with the balance being water, and is adapted to be withdrawn from a reservoir 68 through a conduit 69 by the pump 7, and thence forced through a conduit 71 into the conduit 43 adjacent the lower end of the hopper 42. The slurry is introduced in sufficient quantity to flow from the drum through the opening 57 as the drum is rotating. The slurry which is discharged from the drum is conveyed by conduit 72 and is discharged onto the screen 95 of the separator 6A, from which it drops by gravity into the reservoir 68.

The function of the rotating drum is to remove the metallic particles from the mixture of the material to be separated, as it is being conveyed by the slurry through the drum. To accomplish the separation, the slurry and mixture flows into the drum through the inlet opening 44. The metallic particles being heavier than the ferrosilicon slurry will sink to the bottom of the drum, will be picked up by blades 76 and carried upwardly out of the slurry, and deposited into a chute 77, which is supported in stationary position within the drum, and which extends substantially the full length of the drum. The lower end of the chute is spaced above the lower end of the opening 57 in the drum, and is connected to a chute 78 which conducts the metallic particles onto the screen 105 of the separator 6D.

Attached to the chute 77 within the drum, I have shown a shield 80 which is preferably a concavo-convex member that extends lengthwise of the drum and for substantially the full length thereof. The drum acts as a shield to deflect the slurry which may be picked up with the metallic particles by the blades 76 and to deflect any metallic particles which may fall out of the blades prematurely. The shield is cut along the line of intersection 81 and is welded to the chute. The shield is supported externally of the drum by a strut 82, while the chute 78 is supported at the other end of the drum by a strut 83, the struts, in turn, being supported by the frame 46.

As shown in FIGS. 12 and 13, the lower longitudinal edges 86 and 87 of the shield 80 extend below the bottom of the discharge opening 57, and thus act to prevent the slurry from building up on one side of the drum during the rotation thereof, and also act to confine the floating particles to the central portion of the drum.

The vibratory screen separators 6A, 6B and 6C, as well as the vibratory screen separators 6D, 6E and 6F, respectively are shown diagrammatically in side elevation and partly in section in FIG. 7. In such illustration, the material which is retained by the screen 95 flows progressively onto the screens 97 and 98 respectively. The slurry which passes through the screen 95 may be collected in a reservoir 68, and thence pumped back into the system through the pump 7, whereas the material which passes through the screens 97 and 98 is conveyed through conduit 115 to the magnetic separator 8. The material which is retained by the screen 98 is discharged at 99 as float concentrate.

The material which is retained on the screen 105 of the separator 6D flows successively onto the screens 107 and 110 respectively, the particles comprising sink concentrate and being discharged at 111. The slurry which passes through the screen 105 may be collected in the reservoir 116, and thence conducted to the pump through conduits 106 and 101. The slurry which passes through the screens 107 and 110 respectively is fed to the magnetic separator 9 through conduit 117.

The magnetic separator indicated in general at 3, in FIG. 1 is illustrated in FIG. 2 as embodying a conveyor belt 118, which receives material from the vibratory screen separator 2 at 119, and which may be driven by a motor 120. Disposed above the upper reach of the belt 118, and spaced therefrom a distance sufficient to permit the particles to pass, is an endless belt 121, which extends beyond the end of the belt 118. Interposed between the upper and lower regions of the belt 121 is a magnetic structure 122 which operates to lift the metallic particles from the belt 118 and to cause them to adhere to the lower reach of the belt 121, until they pass the end of the magnetic structure 122. At such point, they move out of the magnetic field and drop by gravity therefrom. A baffle 123 operates to provide an opening 124 through which the non-magnetic particles are discharged for transmittal back to the crusher, and an opening 125 for the magnetic particles which constitute a finished product having a size between that which will pass through a screen having ½" openings, and that which will be retained on a 20 mesh screen. The belt 121 may be driven by a motor 126.

Where ferrosilicon having a size such as will pass through a 100 mesh screen is utilized, then the finest mesh in each of the screens in the separators 6A, 6B, 6C, 6D, 6E and 6F is 100, as a result of which substantially all of the ferrosilicon is recovered for recirculation in the system. Where water is added as at 96 and 108 respectively, the concentration of the slurry is diluted, but the ferrosilicon is recovered from the diluted material by the magnetic separators 8 and 9 respectively, and returned to the pump 7 for recirculation in the system.

An advantage of the present invention is the fact that the system is operable to provide a continuous separation of metallic particles in a range of various sizes, notwithstanding the fact that the particles of metal are initially associated with slag or other non-metallic particles.

I claim:

1. An apparatus for separating metallic particles from a mixture of metallic and non-metallic particles comprising a drum having an inlet opening at one end thereof, means for rotating the drum, a first conduit having one end thereof extending into the inlet opening of said drum, a second conduit in flow communication with the first conduit, the second conduit operating to convey an aqueous slurry of material which has a lower specific gravity than the metallic particles to be separated but a higher specific gravity than the non-metallic particles to be separated, whereby upon rotation of the drum, the mixture is separated into float particles and sink particles, a feed chute in flow communication with each of said conduits for introducing the mixture of feed particles into the drum, means within the drum for picking up sink particles from the bottom thereof and conveying them upwardly, a first discharge chute extending through the drum for receiving slurry and sink particles and conveying them from the drum, the drum having a centrally located discharge opening at the end opposite the inlet opening, a second discharge chute in flow communication with the discharge opening for conducting slurry and float particles from the drum, a first screen for receiving the slurry and sink particles from the first discharge chute, said screen operating to separate the slurry from the sink particles, a second screen operating to receive the sink particles from the first screen, means for introducing a stream of water onto the second screen with said particles, said second screen operating to separate diluted slurry from said sink particles, a magnetic separator operating to receive said diluted slurry and to separate particles of the diluted slurry contained therein from the water, a third screen operating to receive the sink particles from the second screen, said third screen operating to further separate sink particles from the diluted slurry and operating to pass the diluted slurry to said magnetic separator to separate the particles of the diluted slurry contained therein from the water, a reservoir for receiving the slurry from the first screen, a pump connected to the reservoir and also to said second conduit, said pump operating to maintain a continuous circulation of slurry from the reservoir to the drum, means for supporting the first discharge chute in stationary position within the drum, a concavo-convex shield attached to the first discharge chute within the drum and disposed beneath it and coacting therewith as a support therefor, said shield terminating at one end adjacent the inlet end of the drum and having the upper portion thereof disposed above the point at which the first conduit enters the drum, and said shield having the lower longitudinally extending edges thereof disposed below the lower edge of the discharge opening in the drum.

2. An apparatus for separating metallic particles from a mixture of metallic and non-metallic particles comprising a drum having an inlet opening at one end thereof, means for rotating the drum, a first conduit having one end thereof extending into the inlet opening of said drum, a second conduit in flow communication with the first conduit, the second conduit operating to convey an aqueous slurry of material which has a lower specific gravity than the metallic particles to be separated but a higher specific gravity than the non-metallic particles to be separated, whereby upon rotation of the drum, the mixture is separated into float particles and sink particles, a feed chute in flow communication with each of said conduits for introducing the mixture of feed particles into the drum, means within the drum for picking up sink particles from the bottom thereof and conveying them upwardly, a first discharge chute extending through the drum for receiving slurry and sink particles and conveying them from the drum, the drum having a centrally located discharge opening at the end opposite the inlet opening, a second discharge chute in flow communication with the discharge opening for conducting slurry and float particles from the drum, a first screen for receiving the slurry and float particles from the second discharge chute, said screen operating to separate slurry from the float particles, a second screen operating to receive the float particles from the first screen, means for introducing a stream of water onto the second screen with said particles, said second screen operating to separate diluted slurry from said float particles, a magnetic separator operating to receive said diluted slurry and to separate particles of the diluted slurry contained therein from the water, a third screen operating to receive the float particles from the second screen, said third screen operating to further separate float particles from the diluted slurry and operating to pass the diluted slurry to said magnetic separator to separate the particles of the diluted slurry contained therein from the water, a reservoir for receiving the slurry from the first screen, a pump connected to the reservoir and also to said second conduit, said pump operating to maintain a continuous circulation of slurry from the reservoir to the drum, means for supporting the first discharge chute in stationary position within the drum, a concavo-convex shield attached to the first discharge chute within the drum and disposed beneath it and coacting therewith as a support therefor, said shield terminating at one end adjacent the inlet end of the drum and having the upper portion thereof disposed above the point at which the first conduit enters the drum, and said shield having the lower longitudinally extending edges thereof disposed below the lower edge of the discharge opening in the drum.

3. A method of recovering metallic particles from waste slag composed of a mixture of metallic and non-metallic particles, comprising subjecting the slag to a crushing operation so as to fragmentize the slag, passing the fragments thus produced over a first screen, said first screen having openings of substantially one-half inch to separate the fragments into a first group of oversize and undersize fragments, returning the oversize fragments to the crushing operation, passing the undersize fragments over a second screen, said second screen being substantially 20 mesh so as to separate the fragments into a second group of oversize and undersize fragments, subjecting the oversize fragments of the second group to a magnetic separating operation, whereby some of the fragments are magnetically attracted to the separator, recovering the fragments magnetically attracted to the magnetic separator, returning the remaining fragments from said magnetic separator to the crushing operation, passing the second group of undersize fragments over a third screen, said third screen being of substantially 80 mesh, and operating to provide a third group of oversize and undersize fragments, removing the oversize fragments of the third group for subsequent processing, subjecting the undersize fragments of the third group to a magnetic separation, whereby fragments having metal therein are separated from said third group of undersize fragments.

4. A method according to claim 3, wherein said undersize fragments are dropped substantially vertically directly onto said second screen.

5. A method according to claim 3, wherein water is introduced into the system and passed over the said third screen with the second group of undersize fragments.

6. A method according to claim 3, wherein the subsequent process involves a heavy media separation.

References Cited in the file of this patent

UNITED STATES PATENTS

| | | |
|---|---|---|
| Re. 22,191 | Wade | Sept. 29, 1942 |
| 430,280 | Edison | June 17, 1890 |
| 754,756 | Edison | Mar. 15, 1904 |
| 1,146,140 | Dutton | July 13, 1915 |
| 2,276,075 | Wuench | Mar. 10, 1942 |
| 2,352,324 | Hubler | June 27, 1944 |
| 2,387,866 | Walker | Oct. 30, 1945 |
| 2,388,471 | De Vaney | Nov. 6, 1945 |
| 2,564,515 | Vogel | Aug. 14, 1951 |
| 2,597,652 | Manegold | May 20, 1952 |
| 2,692,048 | Davis | Oct. 19, 1954 |
| 2,696,300 | Maust | Dec. 7, 1954 |
| 2,760,633 | Davis | Aug. 28, 1956 |
| 2,795,331 | Douy | June 11, 1957 |
| 2,942,792 | Anderson | June 28, 1960 |